(12) United States Patent
Bilodeau (10) Patent No.: US 12,491,105 B2
(45) Date of Patent: Dec. 9, 2025

(54) ANTI SNORING APPARATUS

(71) Applicant: MIRACLE-Z INC., Longueuil (CA)

(72) Inventor: Michel Bilodeau, Longueuil (CA)

(73) Assignee: MIRACLE-Z INC., Longueuil (CA)

( * ) Notice: Subject to any disclaimer, the term of this patent is extended or adjusted under 35 U.S.C. 154(b) by 512 days.

(21) Appl. No.: 17/637,097

(22) PCT Filed: Aug. 28, 2020

(86) PCT No.: PCT/CA2020/000103
§ 371 (c)(1),
(2) Date: Feb. 22, 2022

(87) PCT Pub. No.: WO2021/035333
PCT Pub. Date: Mar. 4, 2021

(65) Prior Publication Data
US 2022/0296410 A1   Sep. 22, 2022

Related U.S. Application Data (60) Provisional application No. 62/892,794, filed on Aug. 28, 2019.

(51) Int. Cl.
*A61F 5/56* (2006.01)
(52) U.S. Cl.
CPC .................................. *A61F 5/566* (2013.01)
(58) Field of Classification Search
CPC ...... A61F 5/56; A61F 5/566; A61F 2005/563; A61C 7/08; A61C 7/36; A61C 19/063; A61C 19/066; A63B 71/085; A63B 2071/086; A63B 2071/088
See application file for complete search history.

(56) References Cited

U.S. PATENT DOCUMENTS

| 5,313,960 A | 5/1994 | tomasi |
| 7,299,804 B2 | 11/2007 | Kittelsen |
| 2018/0036165 A1* | 2/2018 | Fallon ..................... A61F 5/566 |
| 2019/0350748 A1* | 11/2019 | Fallon ..................... A61F 5/566 |

FOREIGN PATENT DOCUMENTS

WO    WO2021/035333    3/2021

* cited by examiner

*Primary Examiner* — Victoria Hicks Fisher
(74) *Attorney, Agent, or Firm* — Philip A. Swain; Ryan W. Dupuis; Equinox IP Inc.

(57) ABSTRACT

A mouthpiece apparatus used to reduce snoring. The mouthpiece includes a body that is sized and shaped for location in a human mouth. The maxillar and mandibular sets of teeth press against two exterior walls that are interconnected by a connecting sidewall. An interior strengthening matrix is located between the inner walls of the body. The inner walls of the body face each other so that the strengthening matrix allows communication between the exterior walls and allows movement of the body when the set of teeth move relative to each other.

13 Claims, 8 Drawing Sheets

FIG. 11

ANTI SNORING APPARATUS

TECHNICAL FIELD

The present disclosure relates to an apparatus for achieving quality sleep, and more particularly to an anti-snoring apparatus.

BACKGROUND

Snoring is a major problem because it can cause poor quality sleep ultimately leading to sleep deprivation. This is particularly troublesome for the snorer and the snorer's partner. Sleep deprivation may have long term serious health consequences or may affect a person's concentration, which may affect their ability to drive, operate machinery and the like. Snoring may also be a warning sign of obstructive sleep apnea.

Certain sleep positions can trigger snoring by narrowing and obstructing the airways. This causes air to move rapidly through the narrowed airways and results in vibrations of the respiratory structures.

Anti-snoring devices are well-known and widely available to significantly reduce or essentially eliminate snoring. Generally speaking, conventional anti-snoring apparatus are simple mouthpieces that are located in the mouth of a snorer before they go to bed. Alternatively, more complicated anti-snoring apparatus are available, but are often prohibitively expensive for most users. The anti-snoring apparatus operate by maintaining the airways free from obstruction by pressing against the fleshy parts of the mouth, specifically the tongue and the soft tissues, so that they are kept from obstructing the airways.

Several designs of anti-snoring apparatus exist, some of which are exemplified in the following:

U.S. Pat. No. 6,418,933, issued Jul. 16, 2002, entitled "Anti-snoring device and method of making same";

U.S. Pat. No. 6,305,376, issued Oct. 23, 2001, entitled "Device and method for improving breathing";

U.S. Pat. No. 6,055,986, issued May 2, 2000, entitled "Apparatus and method for the reduction of snoring";

U.S. Pat. No. 6,041,784, issued Mar. 28, 2000, entitled "Dental appliance for treatment of snoring and obstructive sleep apnea";

U.S. Pat. No. 5,829,441, issued Nov. 3, 1998, entitled "Customizable dental device for snoring and sleep apnea treatment"; and U.S. Pat. No. 5,755,219, issued May 26, 1998, entitled "Device for improved breathing".

The designs above suffer from a number of disadvantages. Some of the designs are overly complex and thus are costly to produce, which may require modification to existing manufacturing machinery. Further, due to the complexity of some designs, the user will need several visits to the dentist, starting from an initial fitting to any number of visits to finely adjust the apparatus to achieve a desired comfort and anti-snoring efficiency. Some of the apparatus include additional adjustment members, which add to the complexity and also are located directly against the roof of the mouth or against inside of the cheeks. This may cause discomfort to the user after prolonged use. Also, the adjusters are often difficult for the user to operate. Often such adjusters require specialized equipment and may also require the use of several adjustment points. In addition, many of the adjusters are located at or near the front part of the apparatus. This reduces the aesthetic appeal of the apparatus and may also cause irritation to the front lip. Furthermore, most of the designs have bite areas, which cover both the upper (maxilla) and lower (mandibular) sets of teeth. This may cause gagging and a long so-called "break-in" time for some users.

The majority of anti-snoring apparatus use a so-called Mandibular Advancement Device (MAD) principle to reduce snoring. In use, the MAD widens the airway by moving the mandible forwards, relative to maxilla, to prevent closure of the airways. The MADs, however, are known to damage the teeth, such as, resulting in toothache, and further moving the lower jaw can cause long-term problems.

The inventor is also aware of methods to customize anti-snoring apparatus which rely on the use of specialized materials. To ensure a custom fit, the apparatus is placed in boiling water to soften the apparatus. The softened apparatus is then inserted into a user's mouth to create the custom fit. Such methods further add to high manufacturing and maintenance costs for the users.

Thus, there is a need for an improved anti-snoring apparatus that addresses one or more limitations of the conventional designs noted above.

BRIEF SUMMARY

The novel and unobvious anti-snoring mouthpiece apparatus described herein essentially eliminates the need to use the MAD principle to reduce snoring in a human user. Embodiments discussed in this disclosure provide for several snoring reduction techniques. These techniques permit obstruction-free airways to the user which significantly reduces or essentially eliminates the sound associated with snoring. We have observed that by maintaining the mouth open at a certain distance, while reducing the air flow through the mouth by 90%, allows reduction in upper airways obstruction, thereby reducing the noise caused by snoring. We have also observed that by keeping open a single respiratory passage, the nasal passageways, this too reduces the noise caused by snoring.

The apparatus uses a novel and unobvious honeycomb structure located in the mouthpieces that provides both flexibility and resistance to inwardly directed tooth pressure. Using our knowledge of material science, we have incorporated an upper and lower external membrane to provide a soft hold for the teeth. Also provided is a novel connecting system; a rigid band that provides greater structural stiffness to the mouthpiece structure via the connecting system; an adjustable sizing of the mouthpiece to accommodate different users; and smooth edging to improve comfort. Finally, advantageously the apparatus reduces tooth pain, does not require boiling for a custom fit, reduces noise levels due to snoring, reduces teeth grinding and subsequent damage thereof, reduces the incidence of sleep apnea and thus provides a deep, restful sleep. Moreover, athe pparatus is inexpensive, comfortable to use and is adjustable to fit most mouth sizes.

Accordingly, there is provided an embodiment of a mouthpiece to reduce snoring, the mouthpiece comprising:

a body sized and shaped for location substantially in a human mouth having upper and lower sets of teeth, the body having a first exterior sidewall, a second exterior sidewall, the first and second exterior sidewalls having respective first and second inner surfaces; and an interior strengthening matrix located between the first and second inner surfaces of the first and second exterior sidewalls, the first and second inner surfaces being disposed towards each other so that the interior strengthening matrix permits communication between the first and second exterior sidewalls when the upper and lower sets of teeth apply an inwardly directed force thereagainst.

In one example, a center member is sandwiched between the first and second exterior sidewalls, the center member being sized and shaped to register with the interior strengthening matrix, the center member and the exterior sidewalls being shaped to be complementary to each other.

In one example, the interior strengthening matrix includes: a first honeycomb array extending substantially over the entire first inner surface of the first exterior sidewall; a second honeycomb array extending substantially over the entire second inner surface of the second exterior sidewall; and a honeycomb array pattern disposed substantially over the entire surface of the center member, the honeycomb array pattern being registerable with the first and second honeycomb arrays on the first and second inner surfaces of the exterior sidewalls. An internal connecting system connects the exterior sidewalls, the center member and the interior strengthening matrix, the internal connecting system includes: one or more spaced apart connecting members projecting away from the first inner surface of the first exterior sidewall, the one or more connecting members being located adjacent a first outer edge of the first honeycomb array; and one or more spaced apart receiving indents located in the second inner surface of the second exterior sidewall, the receiving indents being located to register with the respective connecting members, the receiving portions being located adjacent a second outer edge of the second honeycomb array. The center member includes one or more spaced apart receiving openings, the receiving openings being located so that the connecting members can pass therethrough for location in the receiving indents, the receiving openings being located adjacent a third outer edge of the second honeycomb array pattern, wherein the one or more connecting members, the one or more receiving indents and the one or more receiving openings are registrable with each other to provide a snug connection between the first and second exterior walls and the center member.

In another example, the first and second exterior walls are made from resilient membranes to snuggly receive the sets of teeth thereagainst.

In another example, the center member is made from resilient membrane.

In another example, the center member includes a center is disposed generally orthogonal relative to the first and second exterior walls.

In yet another example, a first angled gradient is located at a first upper edge located along the entire exterior of the body.

In still another example, a second angled gradient is located at first and second upper and lower edge portions for location against the upper and lower canine teeth.

In one example, the first and second exterior sidewalls each includes a teeth location area against which the sets of teeth are located. An upper and lower ridge is located at the periphery of the first and second exterior sidewalls, the teeth location areas being deformed when the upper and lower sets of teeth inwardly direct forces thereagainst.

In another example, the interior strengthening matrix includes a saliva passageway located on either side of a rearwardly disposed tongue support.

In another example, an upper lip is located at a front portion of first exterior sidewall to reduce air flow entering the mouth.

In one example, the mouthpiece is substantially C-shaped.

In another example, the mouthpiece is symmetrical.

Accordingly, in another embodiment, there is provided an anti-snoring apparatus, the apparatus comprising:

a substantially C-shaped body sized for location substantially in a human mouth, the body having a first exterior sidewall for location against the upper set of teeth; a second exterior sidewall for location against the lower set of teeth, the first and second exterior sidewalls having respective first and second inner surfaces;

a center member sandwiched between the first and second exterior sidewalls; and an interior strengthening matrix located between first and second inner surfaces of the first and second exterior walls, the first and second inner surfaces being disposed towards each other so that the interior strengthening matrix permits communication between the first and second exterior sidewalls when the upper and lower sets of teeth apply an inwardly directed force thereagainst, the center member being sized and shaped to register with the interior strengthening matrix, and the exterior sidewalls being shaped to be complementary to each other.

In one example, the interior strengthening matrix includes: a first honeycomb array extending substantially over the entire first inner surface of the first exterior sidewall; a second honeycomb array extending substantially over the entire second inner surface of the second exterior sidewall; and a honeycomb array pattern disposed substantially over the entire surface of the center member, the honeycomb array pattern being registerable with the first and second honeycomb arrays on the first and second inner surfaces of the exterior sidewalls. An internal connecting system connects the exterior sidewalls, the center member and the interior strengthening matrix, the internal connecting system includes: one or more spaced apart connecting members projecting away from the first inner surface of the first exterior sidewall, the one or more connecting members being located adjacent a first outer edge of the first honeycomb array; and one or more spaced apart receiving indents located in the second inner surface of the second exterior sidewall, the receiving indents being located to register with the respective connecting members, the receiving portions being located adjacent a second outer edge of the second honeycomb array. The center member includes one or more spaced apart receiving openings, the receiving openings being located so that the connecting members can pass therethrough for location in the receiving indents, the receiving openings being located adjacent a third outer edge of the second honeycomb array pattern, wherein the one or more connecting members, the one or more receiving indents and the one or more receiving openings are registrable with each other to provide a snug connection between the first and second exterior walls and the center member.

In one example, the first and second exterior walls are made from resilient membranes to snuggly receive the sets of teeth thereagainst.

In another example, the center member is made from resilient membrane.

In another example, the center member includes a center is disposed generally orthogonal relative to the first and second exterior walls.

In one example, a first angled gradient is located at a first upper edge located along the entire exterior of the body.

In another example, a second angled gradient is located at first and second upper and lower edge portions for location against the upper and lower canine teeth.

In yet another example, the first and second exterior sidewalls each includes a teeth location area against which the sets of teeth are located. An upper and lower ridge is located at the periphery of the first and second exterior sidewalls, the teeth location areas being deformed when the upper and lower sets of teeth inwardly direct forces thereagainst.

In one example, the interior strengthening matrix includes a saliva passageway located on either side of a rearwardly disposed tongue support.

In yet another example, an upper lip is located at a front portion of first exterior sidewall to reduce air flow entering the mouth.

In still another example, the mouthpiece and the apparatus include the first and second exterior sidewalls and the central member, which are made from membranes.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

The terms "mouthpiece" and "apparatus" are used interchangeably throughout. Moreover, the use of positional terms such as "top" and "bottom" are used to reference to the illustrated embodiments in the drawings to which reference is made unless otherwise stated. Moreover, all representations described herein are intended solely to be by way of example for purposes of illustrating certain embodiments and are not intended to limit the scope of the disclosure to any embodiments that may depart from such representation as may be described.

Figure 1A:
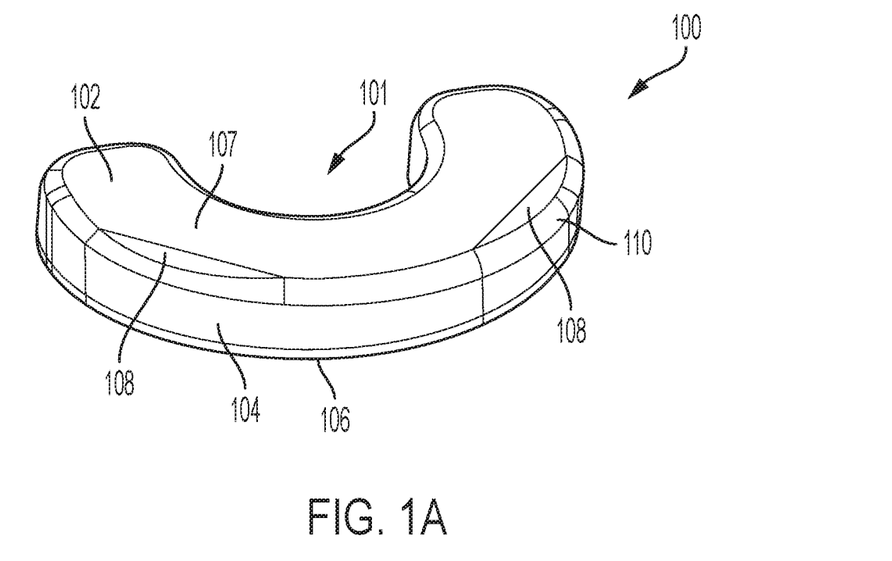
FIG. 1A is a perspective view of an embodiment of an anti-snoring apparatus.
Figure 1B:
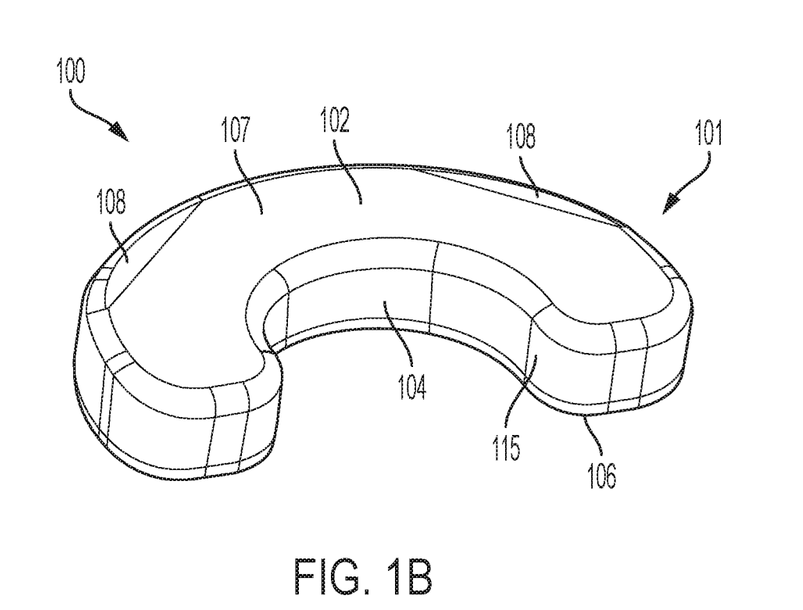
FIG. 1B is another perspective view of the anti-snoring apparatus.

Referring to FIGS. 1A, 1B, and 2 to 4, there is shown an anti-snoring mouthpiece 100 which is useful to significantly reduce, or essentially eliminate, snoring in humans. Generally speaking, the mouthpiece 100 is a unitary body that includes a body 101 sized and shaped for location substantially in a human mouth having upper and lower sets of teeth. The body 101 includes a first exterior sidewall 102, a center member 104 and a second exterior sidewall 106. The first and second exterior sidewalls 102, 106 having respective first and second inner surfaces 103, 105. The center member 104 and the first and second exterior sidewalls 102, 106 are shaped to be complementary to each other. The center member 104 is sandwiched between the first and second exterior sidewalls 102, 106. As is best seen in FIGS. 1A and 1B, the mouthpiece is symmetrical and generally C-shaped (or U-shaped) so as to conform with the size and shape of the human mouth. The first and second exterior sidewalls 102, 106 and the center member 104 are made of material which are sufficiently thin that they can be construed as membranes. The first and second exterior sidewalls 102, 106 and the center member 104, are configured to fit and/or be assembled together with sufficient tightness so that they do not separate during use. The mouthpiece 100 is configured to provide sufficient flexibility thereby allowing the mouthpiece 100, and indeed the first and second exterior sidewalls 102, 106 and the center member 104 to expand when an inwardly directed force is applied by the teeth to the external surfaces of the first and second exterior sidewalls 102 and 106 when the mouthpiece 100 is being used. This is particularly useful if the user is prone to teeth grinding during sleep. Moreover, the shape is designed such that when fitted, the mouthpiece registers with the shape of the upper and lower sets of teeth to provide comfort to the wearer. In addition to the shape of the mouthpiece 100, the materials chosen for its manufacture provide flexibility and allows for ease of insertion into the mouth, i.e. for placement in the mouth, between the teeth and thus reduces the likelihood of damage to the user's teeth.

Referring to FIGS. 1A and 1B, specifically, the first and second exterior sidewalls 102, 106 each includes a teeth location area 107 against which the sets of teeth are located in use.

The first and second exterior sidewalls 102, 106 are interconnected with the connecting center member 104. In a number of conventional designs, the edges between the sidewall and the upper and lower walls are often angled such that they can cause discomfort to the user. To further enhance the comfort and effective use of the mouthpiece 100, the upper and lower edges of the body 101 are smoothed and rounded to create an angled gradient 110 of the wall membrane edges, and further configuration of the surfaces and edges of the first and second exterior sidewalls 102, 106 to create further angled gradients 108. The gradients 108 can be customized depending on a user's teeth configuration, and may generally be created, placed, designed, or configured to be located against the upper and lower canine teeth to allow for a better comfort fit during sleep.

In keeping with general dental practices, the mouthpiece 100 may be made from silicon or latex, or other material with similar characteristics. The mouthpiece may be manufactured using well-known mold and/or extrusion techniques, or other methods known to those skilled in the art. Advantageously, the material used in the manufacture of the mouthpiece further enhances the flexibility and stiffness during use. The material, for example, silicon and/or latex, provides the flexibility necessary to provide a smooth finish of the first and second exterior sidewalls 102, 106, and the center member 104, by using a range of compress scale duro shore, from 25 to 65.

Figure 2:
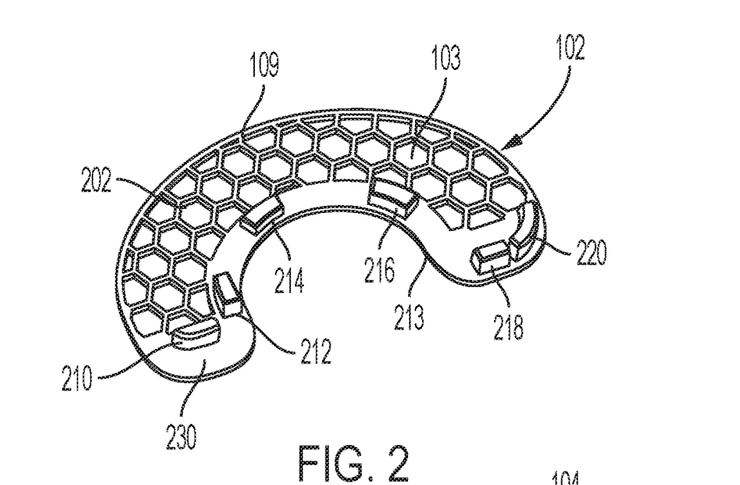
FIG. 2 is a top detailed view of an upper membrane showing a honeycomb structure.
Figure 3:
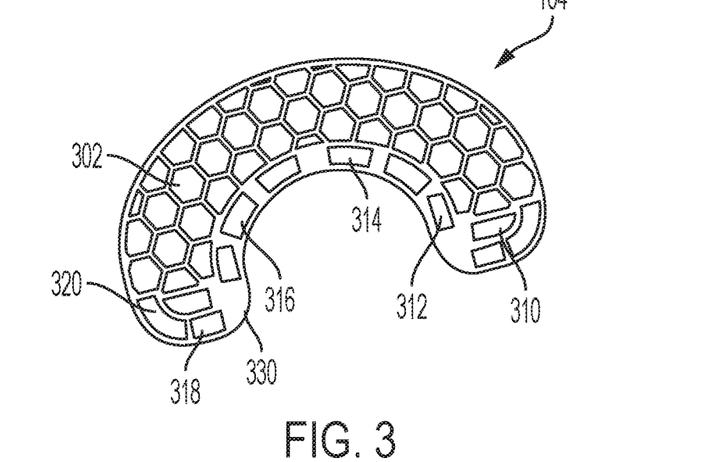
FIG. 3 is a top detailed view of one side of a middle membrane structure.
Figure 4:
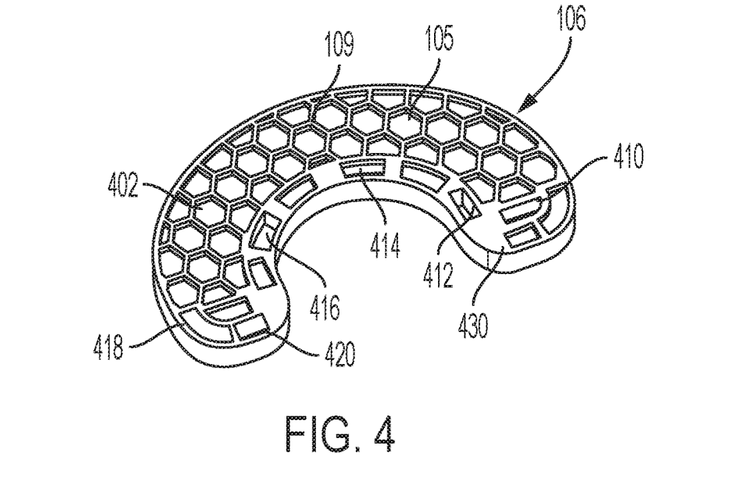
FIG. 4 is top detailed view of a lower membrane showing a honeycomb structure.

Referring now to FIGS. 2, 3 and 4, an interior strengthening matrix 109 is located between the first and second inner surfaces 103, 105 of the first and second exterior sidewalls 102, 106. The first and second inner surfaces 103, 105 are disposed towards each other so that the interior strengthening matrix 109 permits communication between the first and second exterior sidewalls 102, 106 when the upper and lower sets of teeth apply an inwardly directed force thereagainst, when the mouthpiece 100 is located in the mouth. The center member 104 is sandwiched between the first and second exterior sidewalls 102, 106, and is sized and shaped to register with the interior strengthening matrix 109. The center member 104 and the first and second exterior sidewalls 102, 106 are all C-shaped and are thus complementary to each other.

Again, as best seen in FIGS. 2 and 4, the interior strengthening matrix 109 includes a first honeycomb array 202 extending substantially over the entire first inner surface 103 of the first exterior sidewall 102. A second honeycomb array 402 extends substantially over the entire second inner surface 105 of the second exterior sidewall 106. A honeycomb array pattern 302 is disposed substantially over the entire surface of the center member 104. The honeycomb array pattern 302 is registerable with the first and second honeycomb arrays 202, 402 on the first and second inner surfaces 103, 105 of the first and second exterior sidewalls 102, 106. An internal connecting system 230 connects the first and second exterior sidewalls 102, 106 the center member 104 and the interior strengthening matrix 109. The internal connecting system 230 includes one or more spaced apart connecting members 210, 212, 214, 216, 218, and 220. It should be noted that the configuration and design of the connecting member (or projections) 210, 212, 214, 216, 218, and 220 are not limited to what is illustrated, and there may be other configuration and designs of the projections. The connecting members 210, 212, 214, 216, 218, and 220 project away from the first inner surface 103 of the first exterior sidewall 102. The one or more connecting members 210, 212, 214, 216, 218, and 220 are located adjacent a first outer edge 113 (now 213) of the first honeycomb array 202. The second exterior sidewall 106 includes, as part of the connecting system includes a connecting portion 430 that includes one or more spaced apart receiving indents (grooves) 410, 412, 414, 416, 418, and 420. It should be noted that the configuration and design of the inserts grooves 410, 412, 414, 416, 418, and 420 are not limited to what is illustrated, and there may be other configuration and designs of the inserts.

The grooves 410, 412, 414, 416, 418, and 420 are located in the second inner surface 105 of the second exterior sidewall 106, The receiving indents being located to register with the respective connecting members 210, 212, 214, 216, 218, and 220. The receiving indents 410, 412, 414, 416, 418, and 420 are located adjacent a second outer edge of the second honeycomb array 402.

Although a honeycomb array is illustrated, a person skilled in the art would recognize that other shapes such as square, triangle or circle or indeed any type of polygonal shaped array could also be used instead of a diamond-shaped honeycomb.

As best seen in FIG. 3, the center member 104 includes one or more spaced apart receiving openings 310, 312, 314, 316, 318, and 320. It should be noted that the configuration and design of the insert openings 310, 312, 314, 316, 318, and 320 are not limited to what is illustrated, and there may be other configuration and designs of the inserts openings. The receiving openings 310, 312, 314, 316, 318, and 320 are located so that the connecting members 210, 212, 214, 216, 218, and 220 can pass therethrough for location in the receiving indents 410, 412, 414, 416, 418, and 420. The receiving openings 310, 312, 314, 316, 318, and 320 located adjacent a third outer edge of the honeycomb array pattern 302. The one or more connecting members, 210, 212, 214, 216, 218, and 220 the one or more receiving indents 410, 412, 414, 416, 418, and 420 and the one or more receiving openings 310, 312, 314, 316, 318, and 320 are registrable with each other to provide a snug connection between the first and second exterior sidewalls 102, 106 and the center member 104. The honeycomb array pattern 302 may be matched with the first honeycomb array 202 such that the honeycomb array pattern 302 and the second honeycomb array 402 fit together, aligning the boundaries of the hexagons within the honeycomb array pattern 302 with the boundaries of the hexagons within the first honeycomb array 202. However, the honeycomb array pattern 302 and the first honeycomb array 202 need not be aligned, and may be offset to vary the flexibility and stiffness of the apparatus 100. Similar to the first honeycomb array 202, the honeycomb array pattern 302 permits the center member 104 (when assembled with the first and second exterior sidewalls 102, 106 to be flexible while resistant to tooth pressure when in use.

Further, it should be noted that the center member 104 is configured such that when it is assembled and/or fitted with the first and second exterior sidewalls 102, 106 respectively, the center member 104 is able to expand horizontally without weakening the structural side of the honeycomb (both at top sidewall and the bottom sidewall).

In some embodiments, the center member 104 may comprise of one honeycomb array. In such embodiments, the one honeycomb array of the center member may be preferred to match both the first honeycomb array 202 of the first exterior sidewall 102 and the second honeycomb array 402 of the second exterior sidewall 106

Referring still to FIGS. 1 and 1B, the first and second exterior sidewalls 102, 106 are made from resilient membranes to snuggly receive the sets of teeth thereagainst. The center member 104 is also made from resilient membrane. The center member 104 includes a center sidewall 115 is disposed generally orthogonal relative to the first and second exterior sidewalls 102, 106. A first angled gradient 108 is located at a first upper edge located along the entire exterior of the body. A second angled 110 is located at first and second upper and lower edge portions for location against the upper and lower canine teeth.

It should be noted that the first exterior sidewall 102 may be designed such that the connecting portion 430 may have no insert grooves but rather inserts similar to those of the first exterior sidewall 102, such that the inserts of the second exterior sidewall 106 may fit into the insert openings of the-center member 104 similar to how the inserts of the first exterior sidewall 102 fit into the insert openings of the center member 104, as discussed above.

Accordingly, in other embodiments, the connecting portions 230, 330 and 430, may comprise a combination of inserts, insert openings, and insert grooves that permit the upper, lower sidewalls and the center member to fit together to provide the necessary flexibility, stiffness and comfort when in use.

Figure 5:
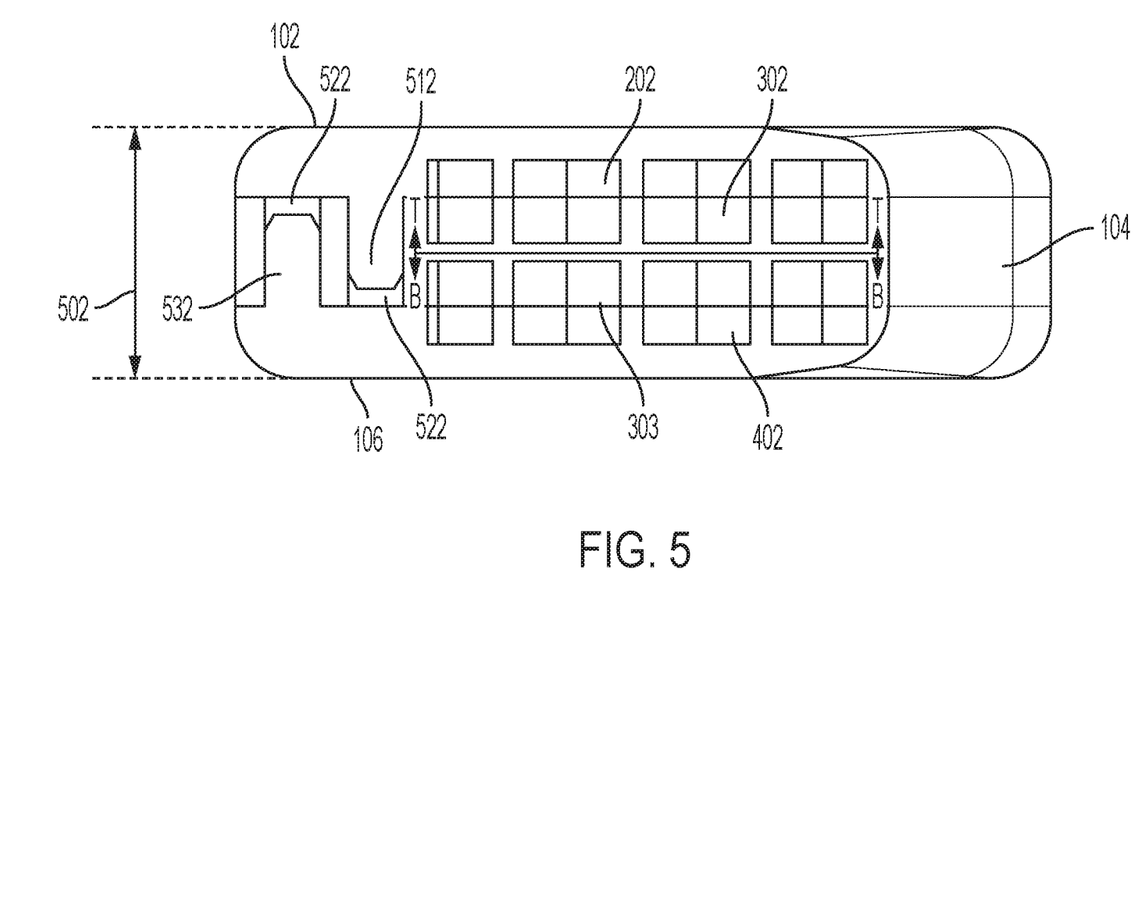
FIG. 5 is partial cutaway side view of the anti-snoring apparatus showing the fitting and/or assembly of the upper, middle and lower membranes.

Referring now to FIG. 5, the top sidewall 102 is fitted and/or assembled with the center member 104 using an insert 512, which maybe any of the inserts 212, 214, 216, 218, and 220 of the first exterior sidewall 102. The insert 512 if fitted into the insert opening 522 of the center member 104, wherein the insert opening 522 may be any of the insert openings 310, 312, 314, 316, 318, and 320 of the center member 104. The honeycomb array 202 of the first exterior sidewall 102 is aligned with the honeycomb pattern 302 of the center member 104, the matching side of the top sidewall, which is indicated by the direction of the T-T line in the FIG. 5.

The center member 104 is assembled/fitted with the first and second exterior sidewalls 102, 106 respectively. The center member 104 is assembled via the insert 512 of the first exterior sidewall 102 and insert 532 of the second exterior sidewall 106. The insert 532 is fitted into the insert opening 522 of the center member 104. The center member 104 includes two side (matching side of the top sidewall, T-T, and the matching side of the bottom sidewall B-B, as indicated in the FIG. 5. The matching side of the bottom sidewall, B-B, includes a honeycomb array 303, as discussed above. The honeycomb array 303 is aligned with the honeycomb array 402 of the second exterior sidewall 106.

The second exterior sidewall 106 is attached/assembled with the center member 104 in a similar fashion as the attachment between the first exterior sidewall 102 and the center member 104.

The first and second exterior sidewalls 102, 106, and the center member 104 may be fitted/assembled together such that the distance 502 from the exterior surface of the first exterior sidewall 102 and the exterior surface of the second exterior sidewall 106 is adjustable. The distance 502 may be adjusted according to the assembly/fitting of the sidewalls and the center member such that when the anti-snoring apparatus 100 is in use, the mouth is kept a certain distance 502 that provides for a 90% reduction of the air supply through the mouth, permitting a clear airway for the user. As a result, the sound associated with snoring is substantially reduced. It should also be noted that keeping only an open breathing passage through the nasal passages significantly reduces the sound due to snoring.

When the first and second exterior sidewalls 102, 106 and the center member 104 are assembled and/or fitted together, the connecting portions 230, 330, and 430 behave as a rigid band, because unlike the honeycomb portion of the sidewalls, which are the portion comprising of the honeycomb array and pattern 202, 302 and 402, the connecting portions behave as one solid part, having no cavities or empty spaces within the assembled connecting portions. As a result, the assembled connecting portions 230, 330, and 430 have a higher stiffness and/or rigidity than the honeycomb arrays/patterns 202, 302, and 402.

When the anti-snoring device 100 is in use, the difference between the stiffness/rigidity of the assembled connecting portions 230, 330, and 430 and the honeycomb arrays/pattern 202, 302, and 402 permit the anti-snoring apparatus 100 to behave/reform/reshape according to the force that is exerted on the anti-snoring apparatus 100, thereby preventing the apparatus 100 from being expelled out from the mouth.

Figure 6:
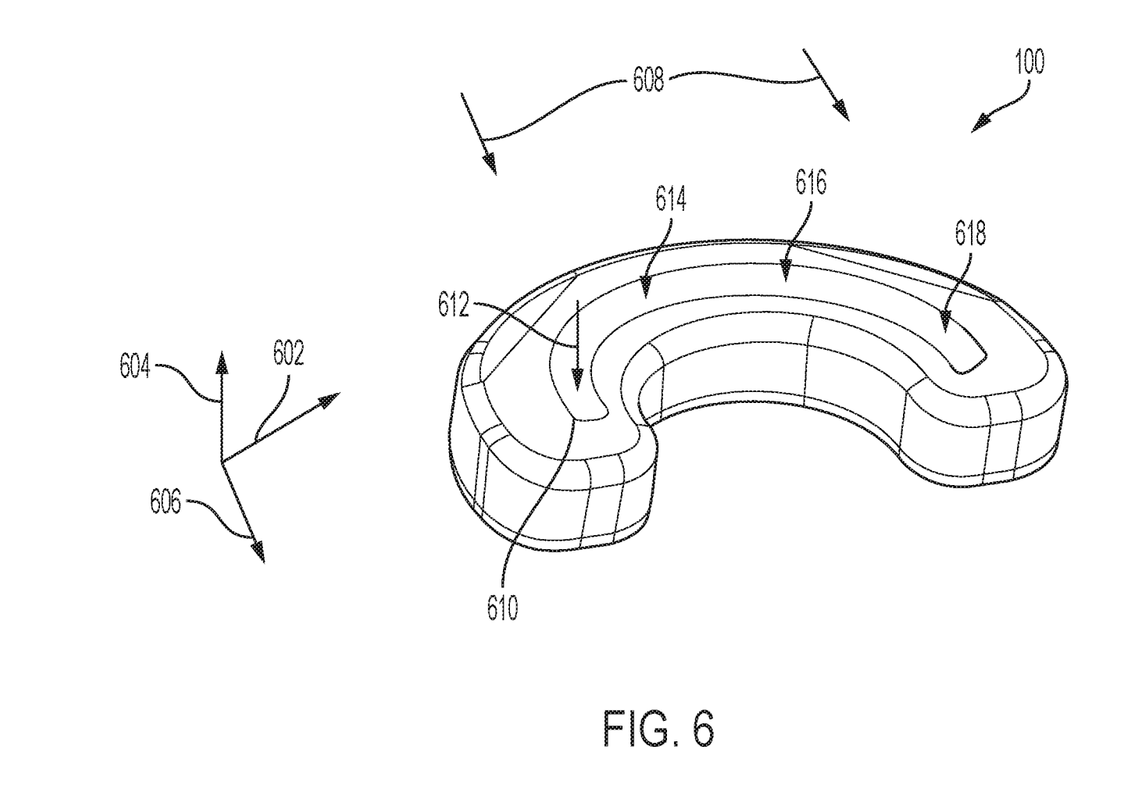
FIG. 6 is a perspective view of the anti-snoring apparatus showing orientation placement for location in a user's mouth.
Figure 7:
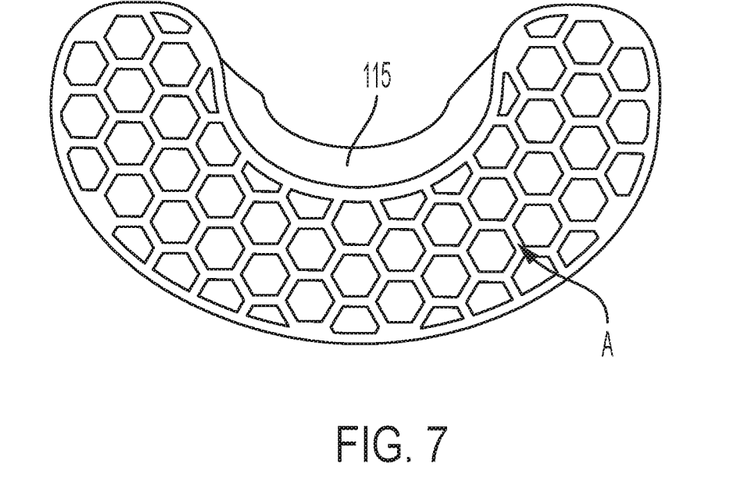
FIG. 7 is a top view of a honeycomb array.
Figure 8:
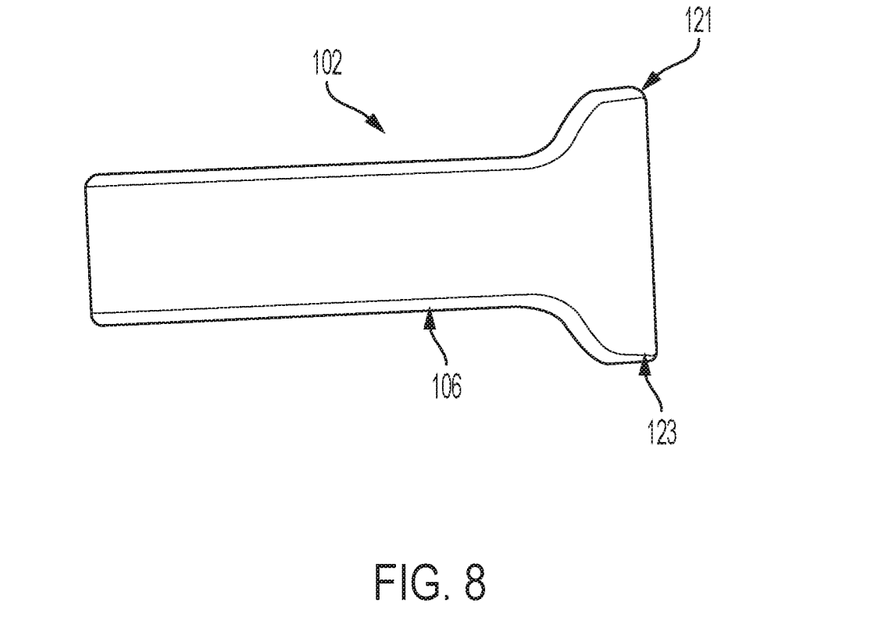
FIG. 8 is a side view of the anti-snoring apparatus showing deformation to create upper and lower ridge.
Figure 9A:
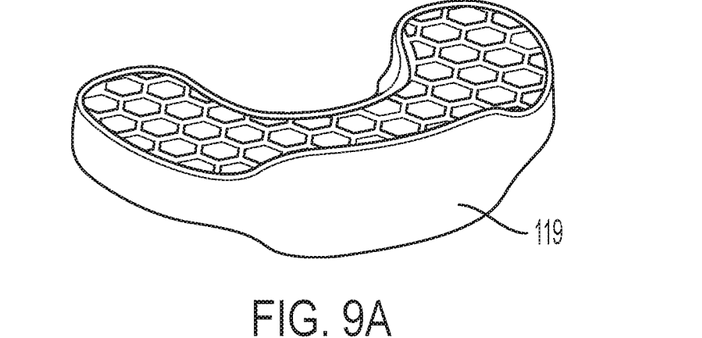
FIG. 9A is a perspective front view of the anti-snoring apparatus showing upper lips located at the front of the apparatus.
Figure 9B:
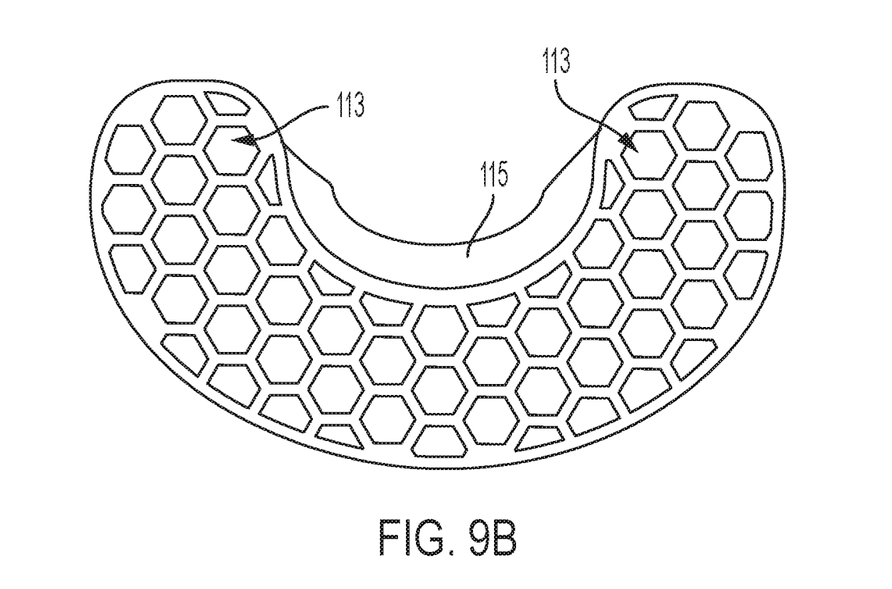
FIG. 9B is a top view showing the location of a saliva passageway and tongue support.
Figure 9C:
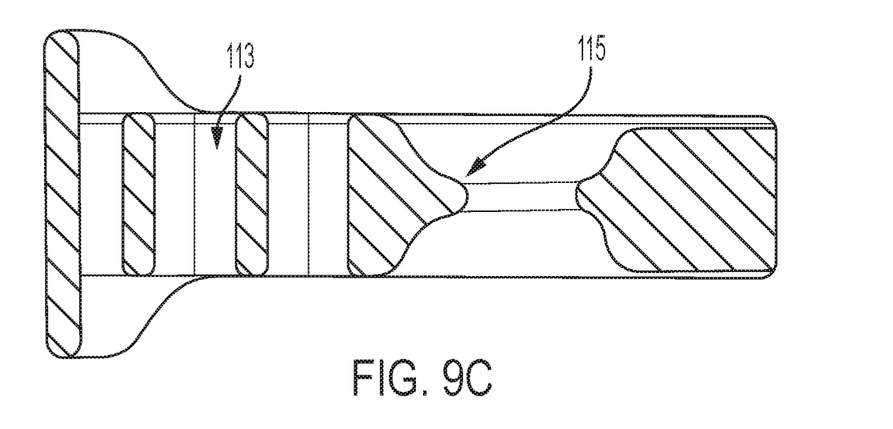
FIG. 9C is a side view showing the location of the saliva passageway and the tong support.
Figure 10A:
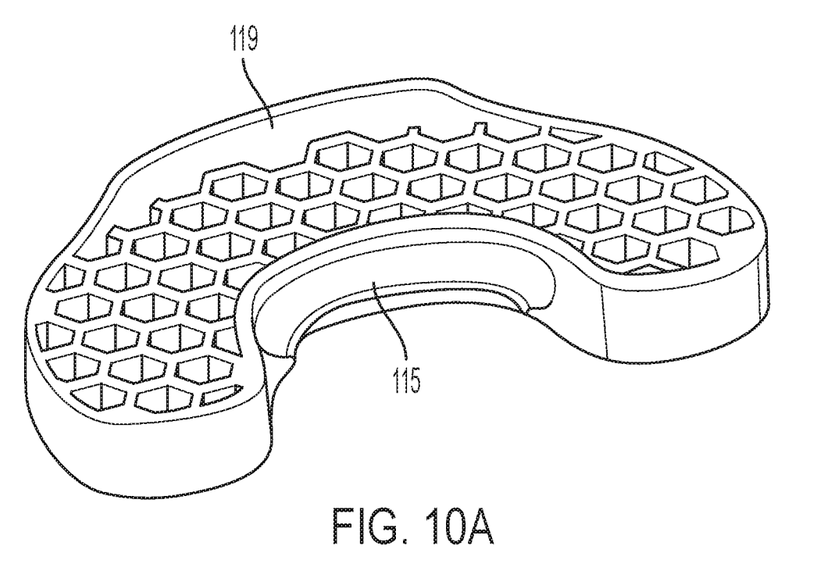
FIG. 10A is a rear perspective view of the anti-snoring apparatus showing the upper lip and tongue support.
Figure 10B:
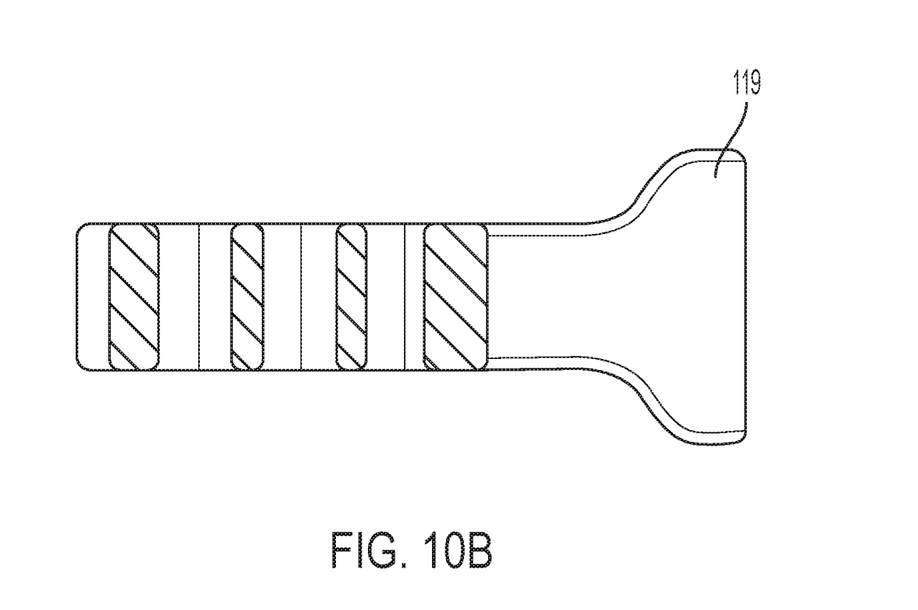
FIG. 10B is another side view showing the location of the saliva passageway and the tongue support.

Referring now to FIG. 6, the anti-snoring 100 is shown as it would be during an insertion movement into the mouth. Assuming the three-dimensional space with axis 602, 604, and 608, the anti-snoring apparatus 100 may be inserted or placed in a user's mouth, in the direction, as shown by arrows 608, which may be parallel with axis 606. The anti-snoring apparatus 100 may be placed in the user's mouth, between the upper and lower sets of teeth, such that the user's teeth may be positioned along the teeth location 610. Accordingly, when the user exerts forces (via teeth) on the apparatus 100, for example, the forces shown by arrows 612, 614, 616, 618, which may be along the 604 axis (or in any direction in the three dimensional space with axis 602, 604, and 606), these forces are by extension on the honeycomb arrays/pattern 202, 302, 402 located internally of the apparatus 100. Because the honeycomb portions of the apparatus 100 are less rigid and more flexible than the connecting portions 230, 330, and 430, as discussed above, the honeycomb portions behave/reform/reshape according to the forces 612, 614, 616, 618, while the connecting portions maintain their form. As a result of reforming/reshaping of the connecting portions, the apparatus is prevented from the being expelled out from the mouth.

Still referring to FIG. 6, it should be noted that the force distribution along the teeth location 610, i.e. the forces 612, 614, 616, and 618 are based on the user's teeth configuration and the force generated by the user. Accordingly, the forces 612, 614, 616, and 618 may be different from each other, and thus the honeycomb portions comprising of the honeycomb structure may respond/reshape/reform according to the force distribution. The force distribution (variation in forces) along the teeth location 610 further enhances the apparatus 100 ability to reshape/reform/respond according to the force distribution, and thus prevent the apparatus 100 from being expelled out of the mouth.

In some embodiments the assembled connecting portions may have empty spaces or cavities, so long as the assembled connection portions have a higher rigidity/stiffness in comparison to the honeycomb portion/structure.

Alternatives

Referring now to FIGS. 7 through 11, a number of alternative embodiments are illustrated. In one example, the apparatus includes no internal cavities which would block the passage of saliva, thereby adding to the overall discomfort of the apparatus when in use. In order to introduce salivary flow, the model includes within the interior strengthening matrix 109, a saliva passageway 113 located on either side of a rearwardly disposed tongue support 115. To improve the stiffness of the design, we added an upper lip 117 located at a front portion 119 of first exterior sidewall to reduce air flow entering the mouth. In another design, as best seen in FIGS. 9A, 9B and 9C, an upper and lower ridge (or lips) 121, 123 is located at the periphery of the first and second exterior sidewalls. The lips 121, 123 reduce the supply of air that could enter the mouth so as to better control the sound level of the snoring and permit a 90% reduction in the supply of air through the mouth. The teeth location areas 107 are deformed when the upper and lower sets of teeth inwardly direct forces thereagainst.

Figure 11:
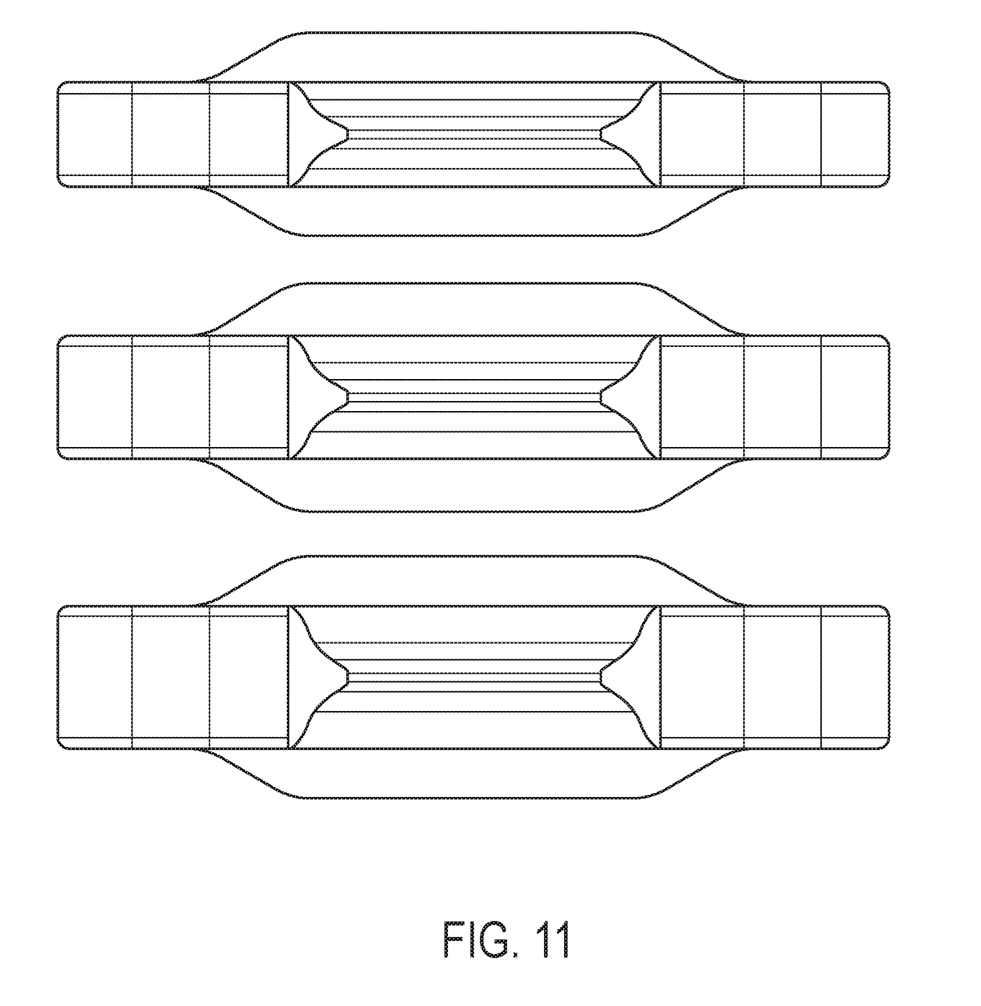
FIG. 11 is a rear, close-up view of the upper and lower lips and the tongue support in models of varying dimensions.

As best seen in FIG. 11, a number of models with varying dimensions are shown. These different models include ridges having varying heights so that the user can select the model that is suitable for his/her mouth.

OTHER EMBODIMENTS

From the foregoing description, it will be apparent to one of ordinary skill in the art that variations and modifications may be made to the embodiments described herein to adapt it to various usages and conditions.

I claim:

1. A mouthpiece to reduce snoring, the mouthpiece comprising:
    a body sized and shaped for location substantially in a human mouth having upper and lower sets of teeth, the body having a first exterior sidewall, a center member, a second exterior sidewall, the first and second exterior sidewalls having respective first and second inner surfaces;
    an interior strengthening matrix located between the first and second inner surfaces of the respective first and second exterior sidewalls, the first and second inner surfaces being disposed towards each other so that the interior strengthening matrix permits communication between the first and second exterior sidewalls when the upper and lower sets of teeth apply an inwardly directed force thereagainst, the interior strengthening matrix includes a saliva passageway located on either side of a rearwardly disposed tongue support, the interior strengthening matrix including:
    i) a first honeycomb array extending substantially over the entire first inner surface of the first exterior sidewall;
    ii) a second honeycomb array extending substantially over the entire second inner surface of the second exterior sidewall, the first and second honeycomb array defining a honeycomb array pattern disposed substantially over the entire surface of the center member, the honeycomb array pattern being registerable with the first and second honeycomb arrays on the respective first and second inner surfaces of the respective first and second exterior sidewalls when the upper and lower sets of teeth apply an inwardly directed force thereagainst;
    one or more spaced apart connecting members projecting away from the first inner surface of the first exterior sidewall, the one or more spaced apart connecting members being located adjacent a first outer edge of the first honeycomb array; and
    one or more spaced apart receiving indents located in the second inner surface of the second exterior sidewall, the one or more spaced apart receiving indents being located to register with the respective one or more spaced apart connecting members, the one or more spaced apart receiving indents being located adjacent a second outer edge of the second honeycomb array.

2. The mouthpiece, according to claim 1, in which the first and second exterior walls are made from resilient membranes to snuggly receive the upper and lower sets of teeth thereagainst.

3. The mouthpiece, according to claim 1, in which the first and second exterior sidewalls each includes a teeth location area against which the sets of teeth are located in use.

4. The mouthpiece, according to claim 3, in which an upper and lower ridge is located at the respective periphery of the first and second exterior sidewalls, the teeth location areas being deformed when the upper and lower sets of teeth inwardly direct forces thereagainst.

5. The mouthpiece, according to claim 1, in which an upper lip is located at a front portion of first exterior sidewall to reduce air flow entering the human mouth.

6. The mouthpiece, according to claim 1, is substantially C-shaped.

7. The mouthpiece, according to claim 1, is symmetrical.

8. An anti-snoring apparatus, the anti-snoring apparatus comprising:
    a substantially C-shaped body sized for location substantially in a human mouth, the substantially C-shaped body having a first exterior sidewall for location against an upper set of teeth; a second exterior sidewall for location against a lower set of teeth, the first and second exterior sidewalls having respective first and second inner surfaces; and a center member sandwiched between the first and second exterior sidewalls;
    an interior strengthening matrix located between the first and second inner surfaces of the respective first and second exterior sidewalls, the first and second inner surfaces being disposed towards each other so that the interior strengthening matrix permits communication between the first and second exterior sidewalls when the upper and lower sets of teeth apply an inwardly directed force thereagainst, the interior strengthening matrix includes a saliva passageway located on either side of a rearwardly disposed tongue support, the interior strengthening matrix including;
    i) a first honeycomb array extending substantially over the entire first inner surface of the first exterior sidewall;
    ii) a second honeycomb array extending substantially over the entire second inner surface of the second exterior sidewall, the first and second honeycomb array defining a honeycomb array pattern disposed substantially over the entire surface of the center member, the honeycomb array pattern being registerable with the first and second honeycomb arrays on the respective first and second inner surfaces of the respective first and second exterior sidewalls when the upper and lower sets of teeth apply an inwardly directed force thereagainst;
    one or more spaced apart connecting members projecting away from the first inner surface of the first exterior sidewall, the one or more spaced apart connecting members being located adjacent a first outer edge of the first honeycomb array; and
    one or more spaced apart receiving indents located in the second inner surface of the second exterior sidewall, the one or more spaced apart receiving indents being located to register with the respective one or more spaced apart connecting members, the one or more spaced apart receiving indents being located adjacent a second outer edge of the second honeycomb array.

9. The apparatus, according to claim 8, in which the first and second exterior walls are made from resilient membranes to snuggly receive the upper and lower sets of teeth thereagainst.

10. The apparatus, according to claim 8, in which the first and second exterior sidewalls each includes a teeth location area against which the upper and lower sets of teeth are located in use.

11. The apparatus, according to claim 10, in which an upper and lower ridge is located at the respective periphery of the first and second exterior sidewalls, the teeth location areas being deformed when the upper and lower sets of teeth inwardly direct forces thereagainst.

12. The apparatus, according to claim 8, in which an upper lip is located at a front portion of first exterior sidewall to reduce air flow entering the human mouth.

13. The mouthpiece, according to claim 1, or the anti-snoring apparatus, according to claim 8, in which the interior strengthening matrix includes a plurality of interconnected circles, squares, or triangles.

* * * * *